United States Patent [19]

Hart et al.

[11] 3,718,620
[45] Feb. 27, 1973

[54] AROMATIC POLYSULPHONE-DIPHENYL SULPHONE BLENDS

[75] Inventors: Charles Richard Hart, Hitchin, Hertfordshire; Eric Nield, Watton-at-Stone, Hertfordshire; John Brewster Rose, Letchworth, Hertforshire, all of England

[73] Assignee: Imperial Chemical Industries Limited, London, England

[22] Filed: June 10, 1971

[21] Appl. No.: 151,917

[30] Foreign Application Priority Data

June 11, 1970 Great Britain....................28,356/70

[52] U.S. Cl..........260/30.8 R, 260/37 R, 260/857 R, 260/865, 260/49
[51] Int. Cl. ............................................C08g 23/10
[58] Field of Search......................260/49, 79, 30.8 R

[56] References Cited

UNITED STATES PATENTS

| | | | |
|---|---|---|---|
| 3,549,595 | 12/1970 | Campbell | 260/49 |
| 3,558,740 | 1/1971 | Behr et al. | 260/823 |
| 3,565,862 | 2/1971 | Campbell et al. | 260/49 |
| 3,579,475 | 5/1971 | Jones et al. | 260/37 |

Primary Examiner—William H. Short
Assistant Examiner—L. L. Lee
Attorney—Cushman, Darby & Cushman

[57] ABSTRACT

A thermoplastic composition is provided comprising (a) 90 to 99.99 percent by weight of at least one aromatic polysulphone consisting essentially of repeating units having the formulas I, II or III, either alone or in combination with each other and/or with up to 80 percent of units having the formula IV

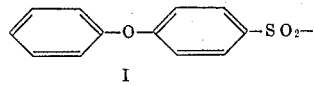

I

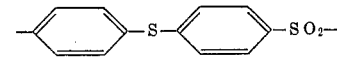

II

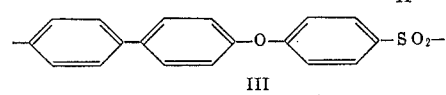

III

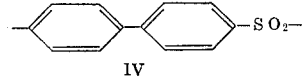

IV and (b) 10 to 0.01 percent by weight of diphenyl sulphone.

6 Claims, No Drawings

AROMATIC POLYSULPHONE-DIPHENYL SULPHONE BLENDS

This invention relates to thermoplastic polymer compositions and in particular to aromatic polysulphones and their blends having improved processability.

Aromatic polysulphones and methods for making them are described in British patent specifications, Nos. 1 016 245, 1 060 246, 1 078 234, 1 109 842, 1 122 192, 1 133 561, 1 153 035, 1 153 528 and 1 177 183 and German Specification No. 2 038 168. They are generally thermoplastic materials of high softening point and considerable resistance to chemical degradation even at high temperatures. Owing to their high softening points, and generally rather high melt viscosities at even higher temperatures, however, specially adapted equipment is often required for fabricating them into shaped articles by moulding or extruding from the melt.

It has now been found that certain aromatic polysulphones and their blends with other thermoplastic materials can be mixed with diphenyl sulphone as processing aid to form compositions having a desirable combination of physical properties. The mixtures of aromatic polysulphones with diphenyl sulphone are usually tough materials having better melt flow properties than the polysulphones themselves.

According to the present invention, a thermoplastic composition is provided comprising (a) 90 to 99.99 percent by weight of at least one aromatic polysulphone consisting essentially of repeating units having the formulae I, II or III, either alone or in combination with each other and/or with up to 80 percent of units having the formula IV,

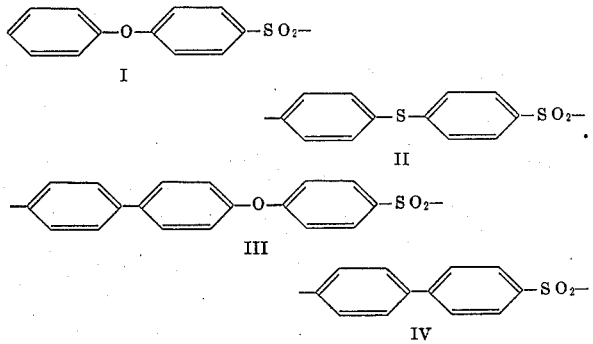

and (b) 10 to 0.01 percent by weight of diphenyl sulphone.

The compositions of the invention are preferably made by mixing diphenyl sulphone with the molten polymer by, for example, extrusion or in a sigma-bladed mixer or in a two-roll mill.

The aromatic polysulphone may be blended with other thermoplastic polymeric substances such as, for example, polyesters, polyolefines, polyamides and polyvinyl chloride. The composition may be further mixed with particles of other polymeric materials having special properties, e.g., elastomeric materials and polytetrafluoroethylene. They may contain reinforcing fillers, for example glass, asbestos, and carbon fibers, and other materials conferring various desired characteristics, e.g., solid lubricants (e.g., graphite or molybdenum disulphide), abrasives (e.g., carborundum), friction-conferring materials, magnetic materials (e.g., for recording tapes), photosensitisers, and any other materials for which the compositions of the invention make suitable vehicles. The compositions may contain dyes and pigments. The compositions may be fabricated in any desired form, such as fiber, film and mouldings or extruded products of any desired shape.

Incorporation of 0.01 to 10 percent by weight of diphenyl sulphone reduces the melt viscosity of the aromatic polysulphone and its blends, resulting in a more even distribution of physical properties in a melt-processed article. Inclusion of quantities in excess of 10 percent by weight can lead to an unacceptable worsening in the desirable physical properties of the composition, for example, softening point and impact strength. In order to reduce the melt viscosity whilst still maintaining acceptable physical properties, a preferred proportion of diphenyl sulphone is from 0.01 percent to 5 percent by weight.

The invention is illustrated by the following example.

EXAMPIE

An aromatic polysulphone consisting essentially of repeating units of the formula

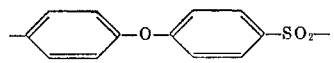

made in manner similar to that described in Example 3 of specification No. 1 153 035, and having a reduced viscosity of 0.43 (measured at 25° C. on a solution in dimethyl formamide containing 1g polymer in 100 cm³ of solution), was mixed with diphenyl sulphone. The composition was prepared by mixing polysulphone (190g) with diphenyl sulphone (10g) in an extruder at 320° C. The extrudate was chipped, re-extruded and chipped and the chip compression-moulded at 330° C. Samples of the composition were compared with similar samples prepared from polysulphone alone and, as shown in the following table, the melt viscosity is reduced by 40 percent, whilst the Full Vicat softening point and impact strength are reduced only by 16 percent and 19 percent respectively.

The impact strength test was carried out at 20° C. on a specimen 51 mm long, 6.3 mm wide, and 3 mm thick having a 45° notch, 2.8 mm deep (tip radius 0.25 mm) in the center of one edge. It was supported between two supports 38 mm apart and struck centrally on the edge opposite the notch by a pendulum dropping from 305 mm with more than sufficient energy to break the specimen. From the residual energy of the pendulum, the energy required to break the specimen was calculated and divided by the cross-sectional area of the specimen at the notch. The resulting value (expressed in kJ/m²) represents the energy required to break the material.

|  | Polysulphone with 5% w/w Diphenyl sulphone | Polysulphone alone |
|---|---|---|
| Full Vicat softening point (°C) | 183 | 219 |
| 1/10 Vicat softening point (°C) | 172 | 210 |
| ¼ mm notched Impact strength (kJ/m²) | 5.25 | 6.50 |

| | | |
|---|---|---|
| Apparent Modulus (dyne/cm$^2$) | $3.0 \times 10^{10}$ | $2.7 \times 10^{10}$ |
| Melt Viscosity at 1000 sec$^{-1}$ at 380°C (kilopoise) | 1.7 | 2.8 |

For comparison, composition was prepared as above except that 4,4'-dichlorodiphenyl sulphone (10g) was used in place of the diphenyl sulphone. The results of physical tests shown in the following table show the inclusion of the additive is associated with a reduction of only 18 percent in the melt viscosity, whilst the impact strength is reduced by 47 percent respectively.

| | Polysulphone with 5% w/w Dichlorodiphenyl sulphone | Polysulphone |
|---|---|---|
| Full Vicat softening point (°C) | 189 | 219 |
| 1/10 Vicat softening point (°C) | 180 | 210 |
| ¼ mm notched Impact Strength (kJ/m$^2$) | 3.40 | 6.50 |
| Apparent modulus (dyne/cm$^2$) | $3.0 \times 10^{10}$ | $2.7 \times 10^{10}$ |
| Melt Viscosity at 1000 sec$^{-1}$ at 380°C (kilopoise) | 2.3 | 2.8 |

A similar composition could be prepared from the aromatic polysulphones consisting essentially of repeating units having the formulae

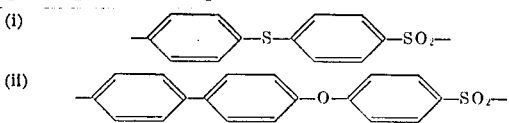

We claim:

1. A thermoplastic composition comprising:
   a. from 90 to 99.99 percent by weight of at least one aromatic polysulphone consisting essentially of repeating units having the formula I, II or III, combinations of any such units with each other or combinations of any such units with units of formula IV, the units of formula IV not exceeding 80 percent of (a):

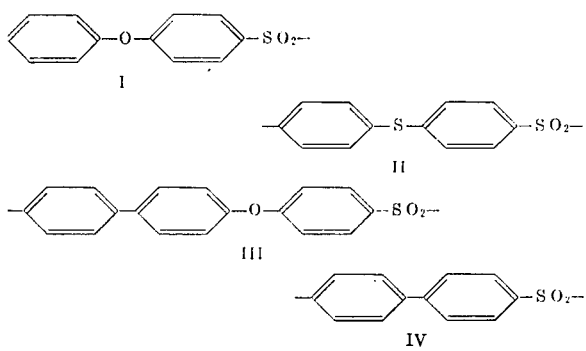

and
   b. from 10 to 0.01 percent by weight of diphenyl sulphone.

2. A thermoplastic composition according to claim 1 in which the aromatic polysulphone consists essentially of repeat units having the formula

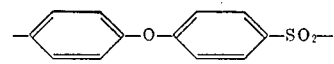

3. A thermoplastic composition according to claim 1 in which the diphenyl sulphone is present in concentration 0.01 to 5 percent by weight.

4. A thermoplastic composition as claimed in claim 1 in the form of a fiber.

5. A thermoplastic composition as claimed in claim 1 in the form of film.

6. A thermoplastic composition as claimed in claim 1 in the form of a moulded article.

* * * * *